United States Patent
Nakamura et al.

(10) Patent No.: US 6,362,925 B1
(45) Date of Patent: Mar. 26, 2002

(54) LENS GROUP ZOOM LENS SYSTEM, AND DISPLAY DEVICE HAVING PHOTOTAKING FUNCTION

(75) Inventors: Tohru Nakamura, Hachioji; Hirofumi Tsuchida, Kunitachi, both of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/494,652

(22) Filed: Jan. 31, 2000

(30) Foreign Application Priority Data

Nov. 12, 1999 (JP) .......................... 11-322454

(51) Int. Cl.$^7$ .............................................. G02B 15/14
(52) U.S. Cl. ........................ 359/690; 359/716; 359/684; 359/685
(58) Field of Search ................................ 359/689, 690, 359/716, 684, 685

(56) References Cited

U.S. PATENT DOCUMENTS 3,141,921 A * 7/1964 Linke .......................... 359/690
3,415,592 A * 12/1968 Price .......................... 359/687
5,642,230 A * 6/1997 Iwata et al. .................. 359/690

FOREIGN PATENT DOCUMENTS

JP          11-6960         1/1999

* cited by examiner

*Primary Examiner*—Ricky Mack
*Assistant Examiner*—Evelyn A. Lester
(74) *Attorney, Agent, or Firm*—Pillsbury Winthrop LLP

(57) ABSTRACT

The invention relates to a zoom lens system of three-group construction, one lens for each group, which is less susceptible to aberration variations even upon zooming and can achieve entire-length reductions, large lens aperture and high zoom ratio. The zoom lens system comprises, in order from an object side thereof, a first lens group G1 consisting of one single lens formed of a homogeneous medium and having positive refracting power, a second lens group G2 consisting of one single lens formed of a homogeneous medium and having negative refracting power, and a third lens group G3 consisting of one single lens formed of a homogeneous medium and having positive refracting power. For zooming from a wide-angle end to a telephoto end of the zoom lens system, at least the second lens group G2 moves from the object side toward an image side of the zoom lens system.

30 Claims, 10 Drawing Sheets

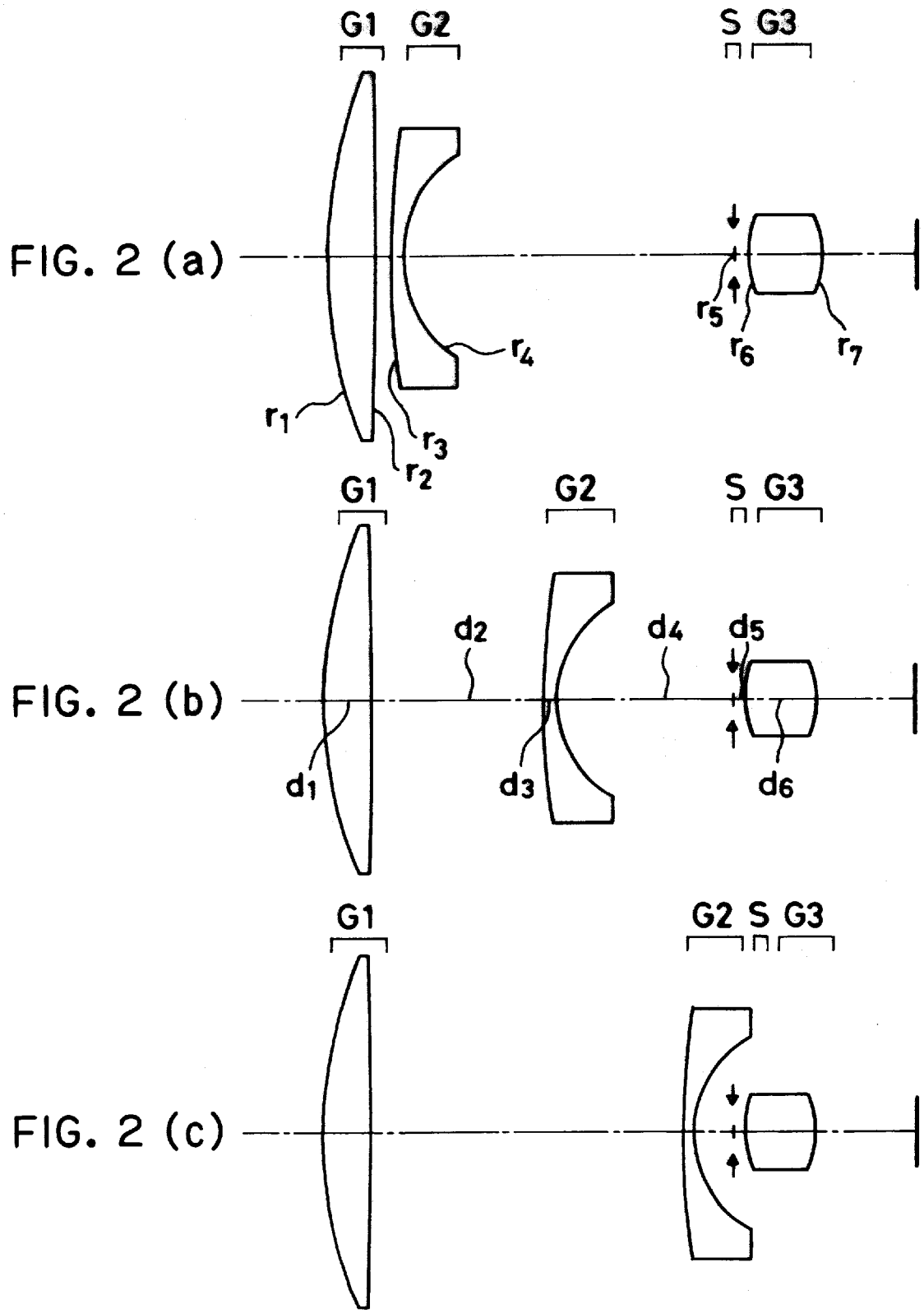

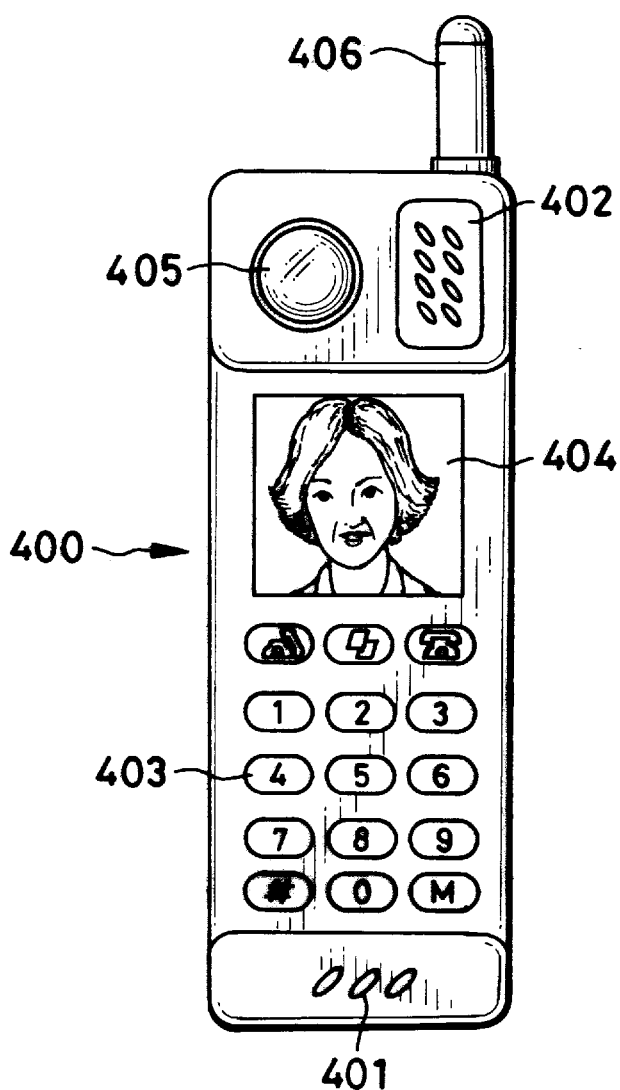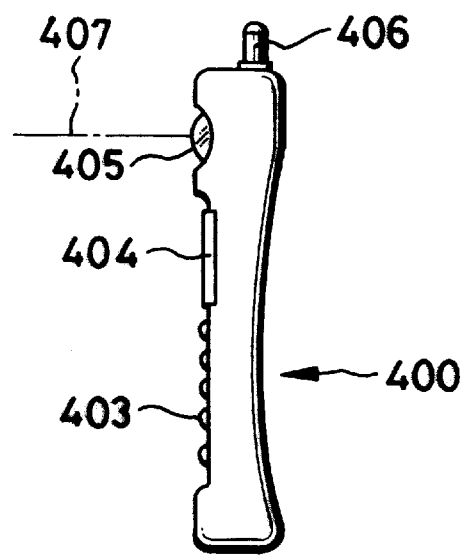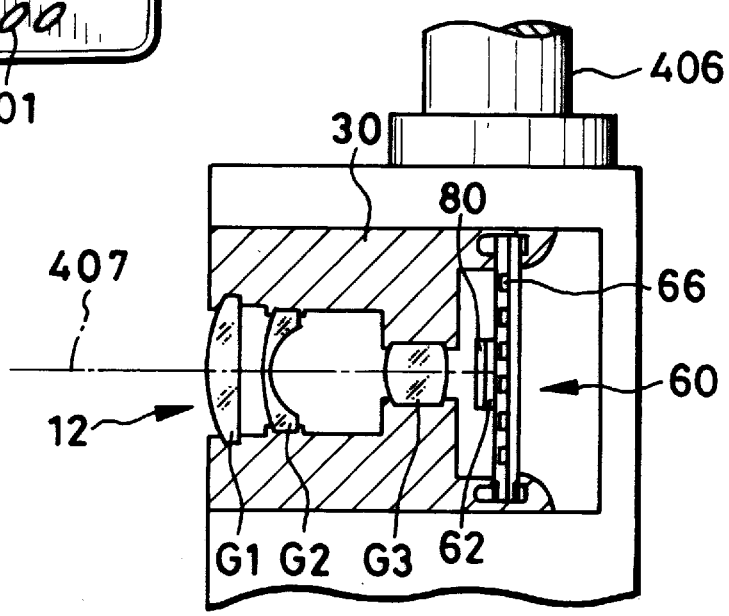

LENS GROUP ZOOM LENS SYSTEM, AND DISPLAY DEVICE HAVING PHOTOTAKING FUNCTION

BACKGROUND OF THE INVENTION

The present invention relates generally to a zoom lens system of three-group construction in which each lens group consists of a single lens alone, and more particularly to a zoom lens system which is suitable for use as an image pickup lens for still cameras, video cameras or the like, and which comprises three groups, each consisting of one lens.

So far, some proposals have been made of a zoom lens system of simple group construction, each group consisting of one single lens. For instance, JP-A 11-6960 discloses a zoom lens optical system of three-group construction, each group consisting of one lens using a gradient index medium rather than a homogeneous medium that is easily available and easy to process.

SUMMARY OF THE INVENTION

In view of such a problem with the prior art as mentioned above, it is an object of the present invention to provide a zoom lens system of three-group construction, each consisting of one single lens, which is less susceptible to aberration variations even upon zooming and can achieve entire-length reductions, large lens aperture and high zoom ratio.

According to one aspect of the invention, this object is achievable by the provision of a zoom lens system of three-group construction, which comprises, in order from an object side thereof, a first lens group consisting of one single lens formed of a homogeneous medium and having positive refracting power, a second lens group consisting of one single lens formed of a homogeneous medium and having negative refracting power, and a third lens group consisting of one single lens formed of a homogeneous medium and having positive refracting power, and wherein for zooming from a wide-angle end to a telephoto end of said zoom lens system, at least said second lens group moves from said object side toward an image side of said zoom lens system.

Preferably in this case, the first lens group should consist of one convex lens having a strong convex surface directed to an object plane side of the zoom lens system and the second lens group should consist of one concave lens having a strong concave surface directed toward an image plane side of the zoom lens system.

The zoom lens system of the invention should preferably satisfy the following relation:

$$f_W < f_3 < f_T \quad (1)$$

where $f_W$ is a focal length at which the focal length of the zoom lens system is shortest, $f_T$ is a focal length at which the focal length of the zoom lens system is longest and $f_3$ is a focal length of the third lens group.

Preferably, a convex lens in the third lens group should have at least one surface defined by an aspherical surface.

Preferably, the convex lens in the third lens group should be a double-convex lens.

Preferably, the zoom lens system of the invention should satisfy the following ratio relation:

$$-3.5 < f_1/f_2 < -2.0 \quad (2)$$

where $f_1$ is a focal length of the first lens group and $f_2$ is a focal length of the second lens group.

Preferably, the zoom lens system of the invention should satisfy the following ratio relation:

$$5.0 < f_1/f_3 < 10.0 \quad (3)$$

where $f_1$ is a focal length of the first lens group and $f_3$ is a focal length of the third lens group.

Preferably, the zoom lens system of the invention should satisfy the following ratio relation:

$$0.5 < L/f_T < 1.5 \quad (4)$$

where L is a distance from a rear surface in the second lens group to an image plane of the zoom lens system, at which the focal length of the zoom lens system is longest and $f_T$ is a focal length at which the focal length of the zoom lens system is longest.

Preferably, the first lens group should remain fixed during zooming from the wide-angle end to the telephoto end of the zoom lens system.

According to another aspect of the invention, there is provided a display device with a built-in three-group zoom lens system having phototaking function, which comprises:

a first lens group consisting of one positive lens, a second lens group consisting of one negative lens, a third lens group consisting of one positive lens, and an electronic image pickup element for receiving an object image formed by only refracting powers of said first lens group, said second lens group and said third lens group, a processing circuit for electrically processing information on said object image received by said electronic image pickup element, and an image display element for displaying the information on said object image fed through said processing circuit to an viewer.

Preferably in this case, the three-group zoom lens system should be constructed in such a way that separations between the first lens group, the second lens group and the third lens group are varied for zooming from a wide-angle end to a telephoto end of the system.

Alternatively, the three-group zoom lens may be constructed for zooming from the wide-angle end to the telephoto end of the system in such a way that the separation between the first lens group and the second lens group becomes wide and the separation between the second lens group and the third lens group becomes narrow.

Preferably, a stop should be located between the second lens group and the third lens group.

A filter may be located between the third lens group and the electronic image pickup element.

The filter may be in a plane-parallel plate form.

The first lens group may consist of one cemented lens comprising a plurality of cemented lens elements.

The first lens group may consist of one lens element.

The second lens group may consist of one cemented lens comprising a plurality of cemented lens elements.

The second lens group may consist of one lens element.

The third lens group may consist of one cemented lens comprising a plurality of cemented lens elements.

The third lens group may consist of one lens element.

The image display element may be built up of a liquid crystal display having a flat screen.

Preferably, the third lens group should have at least one aspherical surface configured to make correction for aberrations.

In the another aspect of the invention, too, the following ratio relation should preferably be satisfied:

$$f_W < f_3 < f_T \quad (1)$$

where $f_W$ is a focal length at which the focal length of the zoom lens system is shortest, $f_T$ is a focal length at which the focal length of the zoom lens system is longest and $f_3$ is a focal length of the third lens group.

Preferably, the following ratio relation should be satisfied:

$$-3.5 < f_1/f_2 < -2.0 \tag{2}$$

where $f_1$ is a focal length of the first lens group and $f_2$ is a focal length of the second lens group.

Preferably, the following ratio relation should be satisfied:

$$5.0 < f_1/f_3 < 10.0 \tag{3}$$

where $f_1$ is a focal length of the first lens group and $f_3$ is a focal length of the third lens group.

Preferably, the following ratio relation should be satisfied:

$$0.5 < L/f_T < 1.5 \tag{4}$$

where L is a distance from a rear surface in the second lens group to an image plane of the zoom lens system, at which the focal length of the zoom lens system is longest and $f_T$ is a focal length at which the focal length of the zoom lens system is longest.

The first lens group may remain fixed during zooming from the wide-angle end to the telephoto end.

Preferably, the zoom lens system should be compactly housed in the display device by allowing the first lens group and the second lens group to move in such a way that a distance from a surface located nearest to the object side in the first lens group to the electronic image pickup element is reduced to a length between 20 mm and 2 mm.

Preferably, the first lens group should remain fixed form zooming from the wide-angle end to the telephoto end of the zoom lens system.

Preferably, the separations between the first lens group, the second lens group and the third lens group should be variable in such a way as to satisfy the following zoom ratio condition:

$$1.2 < f_T/f_W < 25.0 \tag{6}$$

where $f_W$ is a focal length at which the focal length of the zoom lens system is shortest and $f_T$ is a focal length at which the focal length of the zoom lens system is longest.

According to yet another aspect of the invention, there is provided a telephone handset comprising a display device with a built-in two-group zoom lens system having phototaking function, a microphone for entering an operator's voice therein, a speaker for producing a voice of a person on the other end and a dial button for entering at least a telephone number therein.

The telephone handset may be constructed in the form of a portable telephone set having an antenna for transmitting and/or receiving radio waves.

why the aforesaid arrangements are used and how they word will now be described.

In the zoom lens system of three-group construction according to the present invention, the first lens group consists of one single lens formed of a homogeneous medium and having positive refracting power, the second lens group consists of one single lens formed of a homogeneous medium and having negative refracting power and the third lens group consists of one single lens formed of a homogeneous medium and having positive refracting power, and for zooming the wide-angle end to the telephoto end of the system, at least the second lens group is designed to move from the object side to the image side of the system. Thus, the third lens group takes a chief part in the image-forming action of the lens system. The condition to this end is condition (1). In an intermediate setting, the power of the zoom lens system is substantially equal to the power of the third lens group. As the telephoto or wide-angle end is reached, the field angle varies with the first or second lens group. This arrangement is favorable in view of aberration correction because the height of a ray passing through the third lens group remains substantially unchanged irrespective of zooming settings. For aberration correction, it is favorable to use an aspherical surface in the third lens group because considerable aberrations are produced at the second lens group, and because off-axis coma can be corrected with correction of spherical aberration.

Since, in the invention, the field angle is varied by varying the separation between the first lens group and the second lens group, some refracting power difference must be between both lens groups. Otherwise, the amount of zooming movement increases. When the upper limit of −2.0 in condition (2) is exceeded, the refracting power difference between the first lens group and the second lens group vanishes, resulting in an increase in the amount of zooming movement. It is not preferable to be short of the lower limit of −3.5 in condition (2) because the refracting powers of the first and second lens groups becomes too large, and aberrations produced there increase accordingly.

The refracting power ratio between the first lens group and the second lens group is defined as mentioned above. However, it is to be understood that too large refracting power causes aberrations to become worse. When the lower limit of 5.0 in condition (3) is not reached, the refracting power of the first lens group becomes too strong, causing aberrations to become worse. When the upper limit of 10.0 in condition (3) is exceeded, on the other hand, the zoom lens system becomes large due to too weak refracting power.

To make the zoom lens system compact, it is required to make short the distance from the rear surface in the second lens group to the image plane. In other words, it is preferable that condition (4) is satisfied while the focal length of the zoom lens system is longest. When the upper limit of 1.5 in condition (4) is exceeded, it is impossible to make the zoom lens system compact. It is not preferable to be short of the lower limit of 0.5 because spherical aberration at the second lens group remains under-corrected.

More preferably, condition (4) should be reduced to:

$$0.7 < L/f_T < 1.4 \tag{5}$$

Preferably in the zoom lens system of the invention, the separation between the first lens group and the second lens group should be variable in such a way as to satisfy the following zoom ratio ($f_T/f_W$) condition:

$$1.2 < f_T/f_W < 25.0 \tag{6}$$

Here $f_W$ is a focal length at which the focal length of the zoom lens system is shortest and $f_T$ is a focal length at which the focal length of the zoom lens system is longest.

In one preferable embodiment of the invention, this zoom lens system is used with an electronic image pickup element such as a CCD to set up a display device having phototaking function for an electronic camera or the like. According to this embodiment, the zoom lens system can be compactly housed in the display device by allowing the first and second lens groups to move in such a way that the distance from the surface located nearest to the object side in the first lens group to the electronic image pickup element is reduced to the length between 20 mm and 2 mm.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 2(a), 2(b) and 2(c) are sectional views of Example 2 of the zoom lens system according to the invention at the wide-angle end, intermediate setting and telephoto end, respectively.

FIGS. 12(a), 12(b) and 12(c) are a front view, a side view and a sectional view of a portable telephone handset, respectively, in which the zoom lens system of the invention is incorporated in the form of an objective optical system.

DESCRIPTION OF THE PREFERRED EMBODIMENTS

The zoom lens system of the invention will now be explained with reference to two examples.

Figure 1A:
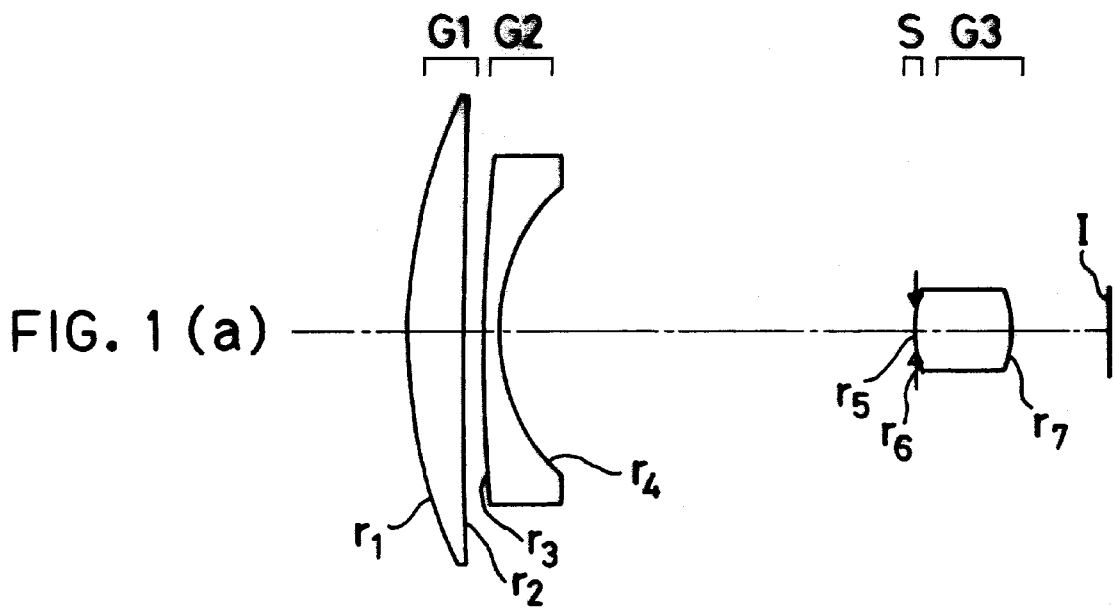
FIGS. 1(a), 1(b) and 1(c) are sectional views of Example 1 of the zoom lens system according to the invention at the wide-angle end, intermediate setting and telephoto end, respectively.
Figure 1B:
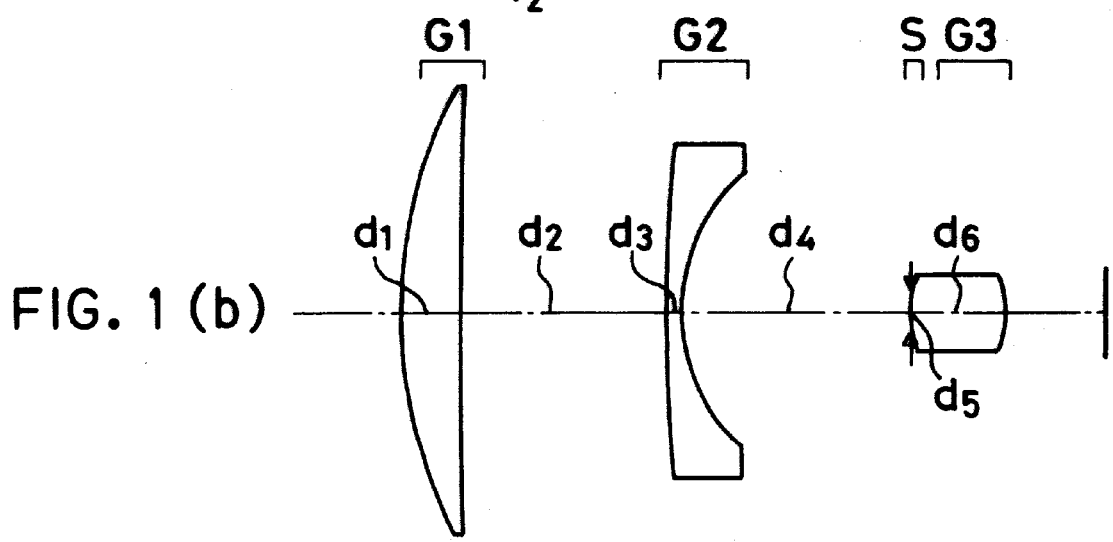
Figure 1C:
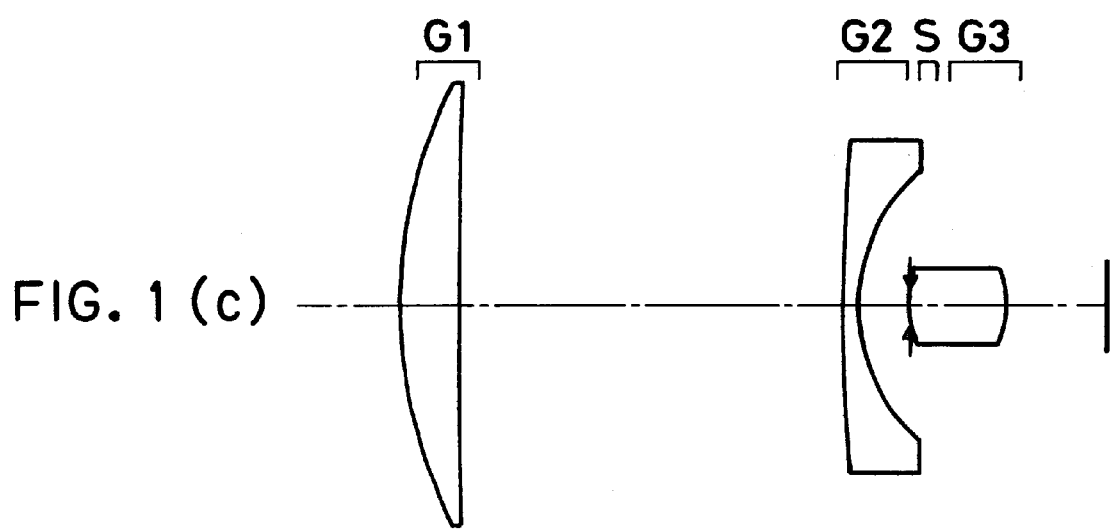

FIGS. 1(a), 1(b) and 1(c) are sectional views of Example 1 of the zoom lens system according to the invention at the wide-angle end, intermediate setting and telephoto end, respectively, and FIGS. 2(a), 2(b) and 2(c) are sectional views of Example 2 of the zoom lens system according to the invention at the wide-angle end, intermediate setting and telephoto end, respectively. Numerical data on each example will be enumerated later.

EXAMPLE 1

This example is directed to a zoom lens system having a focal length of 4 to 10 mm. In FIGS. 1(a), 1(b) and 1(c), G1, S, G2 and G3 stand for a first lens group, a stop, a second lens group and a third lens group, respectively, while I represents an image formation surface. This zoom lens system is a zoom lens system of three-group construction wherein the first lens group G1 consists of one positive meniscus lens having a strong convex surface directed toward an image plane side of the system and has positive refracting power, the second lens group G2 consists of one negative meniscus lens having a strong concave surface directed toward the image plane side and has negative refracting power, and the third lens group G3 consists of one double-convex lens and has positive refracting power. For zooming from the wide-angle end to the telephoto end of the system, the second lens group G2 moves largely from a first lens group G1 side toward a third lens group G3 side while the first lens group G1 remains fixed. To keep an image plane position constant at this time, the third lens group G3 first makes a little movement together with the stop toward the object side, and then moves back in an image plane direction after passing the intermediate setting. In this example, the position of the third lens group G3 at the wide-angle end coincides with that at the telephoto end. An aspherical surfaces is used for the image-side surface of the double-convex lens in the third lens group G3.

EXAMPLE 2

This example is directed to a zoom lens system having a focal length of 4 to 12 mm. In FIGS. 2(a), 2(b) and 2(c), G1, S, G2 and G3 stand for a first lens group, a stop, a second lens group and a third lens group, respectively, while I represents an image formation surface. This zoom lens system is a zoom lens system of three-group construction wherein the first lens group G1 consists of one double-convex lens having a strong convex surface directed toward an image plane side of the system and has positive refracting power, the second lens group G2 consists of one negative meniscus lens having a strong concave surface directed toward the image plane side and has negative refracting power, and the third lens group G3 consists of one double-convex lens and has positive refracting power. For zooming from the wide-angle end to the telephoto end of the system, the second lens group G2 moves largely from a first lens group G1 side toward a third lens group G3 side while the first lens group G1 remains fixed. To keep an image plane position constant at this time, the third lens group G3 first makes a little movement together with the stop toward the object side, and then moves back in an image plane direction after passing the intermediate setting. The stop S is located on the object side of the third lens group G3, and moves independently during zooming while separations between it and the second lens group G2 and it and the third lens group G3 are varied. Two aspherical surfaces are used for booths sides of the double-convex lens in the third lens group G3. Example 2 is better in terms of zoom ratio and brightness than Example 1 because two aspherical surfaces are used.

Set out below are numerical data on Examples 1 and 2. The symbols used hereinafter but not hereinbefore have the following means:

f is a focal length of the overall system,
$F_{NO}$ is an F-number,
ω is a half field angle,
$f_B$ is a back focus,
$r_1, r_2, \ldots$ are radii of curvature of lens surfaces, $d_1, d_2, \ldots$ are separations between adjacent lens surfaces, $n_{d1}, n_{d2}, \ldots$ are d-line indices of refraction of lenses, and $v_{d1}, V_{d2}, \ldots$ are d-line Abbe's numbers of lenses.

Here let x denote a positive direction of propagation of light and y represent a direction perpendicular to the optical axis. Then, aspherical shape is given by $$x=(y^2/r)/[1+\{1-(K+1)(y/r)^2\}^{1/2}]+A_4 y^4+A_6 y^6$$

where r is a radius of paraxial curvature, K is a conical coefficient, and $A_4$ and $A_6$ are fourth and sixth-order aspherical coefficients, respectively. The values of coefficients not referred to hereinbelow are zero.

EXAMPLE 1

$f=4.0\sim6.3\sim10.0$
$F_{NO}=4.000\sim4.000\sim4.000$
$\omega=28.0°\sim17.6°\sim11.1°$
$f_B=4.8280\sim4.8919\sim4.8280$

| | | | | | | |
|---|---|---|---|---|---|---|
| $r_1 =$ | 24.1212 | $d_1 =$ | 2.8000 | $n_{d1} = 1.51633$ | $v_{d1} = 64.14$ |
| $r_2 =$ | 254.4161 | $d_2 =$ | (Variable) | | |
| $r_3 =$ | 93.5599 | $d_3 =$ | 0.8000 | $n_{d2} = 1.51633$ | $v_{d2} = 64.14$ |
| $r_4 =$ | 8.6471 | $d_4 =$ | (Variable) | | |
| $r_5 =$ | ∞ (Stop) | $d_5 =$ | 0.0000 | | |
| $r_6 =$ | 5.7201 | $d_6 =$ | 4.6098 | $n_{d3} = 1.52542$ | $v_{d3} = 55.78$ |
| $r_7 =$ | −4.5588(Aspheric) | | | | |

Zooming Spaces

| f | 4.0 | 6.3 | 10.0 |
|---|---|---|---|
| $d_2$ | 1.0000 | 9.9975 | 18.5620 |
| $d_4$ | 19.9620 | 10.9007 | 2.4000 |

Aspherical Coefficients
  7 th surface
  K =0
  $A_4=1.8752\times10^{-3}$
$f_3=5.711$
$f_1/f_2=-2.776$
$f_1/f_3=9.0$
$L/f_T=1.184$

EXAMPLE 2

$f=4.0\sim6.9\sim12.0$
$F_{NO}=2.800\sim2.800\sim2.800$
$\omega=28.1°\sim15.7°\sim9.2°$
$f_B=6.0254\sim6.2185\sim6.2549$

| | | | | | |
|---|---|---|---|---|---|
| $r_1 =$ | 27.7492 | $d_1 =$ | 3.0000 | $n_{d2} = 1.51633$ | $v_{d1} = 64.14$ |
| $r_2 =$ | −359.6369 | $d_2 =$ | (Variable) | | |
| $r_3 =$ | 48.8774 | $d_3 =$ | 0.8000 | $n_{d2} = 1.51633$ | $v_{d2} = 64.14$ |
| $r_4 =$ | 6.8A68 | $d_4 =$ | (Variable) | | |
| $r_5 =$ | ∞ (Stop) | $d_5 =$ | (Variable) | | |
| $r_6 =$ | 6.7162(Aspheric) | $d_6 =$ | 4.4320 | $n_{d3} = 1.52542$ | $v_{d3} = 55.78$ |
| $r_7 =$ | −5.3034(Aspheric) | | | | |

Zooming Spaces

| f | 4.0 | 6.9 | 12.0 |
|---|---|---|---|
| $d_2$ | 1.0000 | 10.6830 | 19.3976 |
| $d_4$ | 20.7976 | 11.1147 | 2.4000 |
| $d_5$ | 1.0000 | 0.8069 | 0.7706 |

Aspherical Coefficients
  6 th surface
  K=0
  $A_4=-1.3357\times10^{-3}$
  $A_6=-7.1453\times10^{-6}$
  7 th surface
  K=0
  $A_4=9.7405\times10^{-4}$
  $A_6=-3.6001\times10^{-5}$
$f_3=6.461$
$f_1/f_2=-3.223$
$f_1/f_3=7.743$
$L/f_T=1.155$ In Examples 1 and 2, focusing may be carried out by moving the third lens group G3 together with the stop S. The strong power of this lens group makes it possible to the amount of driving the lens system. Set out below are focusing data about Examples 1 and 2.

EXAMPLE 1

| | Object Distance | Group Separation $(d_4 + d_5)$ | Back Focus |
|---|---|---|---|
| Wide-Angle End | 100.000 | 19.821 | 4.969 |
| Intermediate | 100.000 | 10.576 | 5.216 |
| Telephoto End | 100.000 | 1.585 | 5.643 |

EXAMPLE 2

|  | Object Distance | Group Separation ($d_4 + d_5$) | Back Focus |
|---|---|---|---|
| Wide-Angle End | 100.000 | 21.654 | 6.169 |
| Intermediate | 100.000 | 11.526 | 6.614 |
| Telephoto End | 100.000 | 1.919 | 7.506 |

Figure 3:
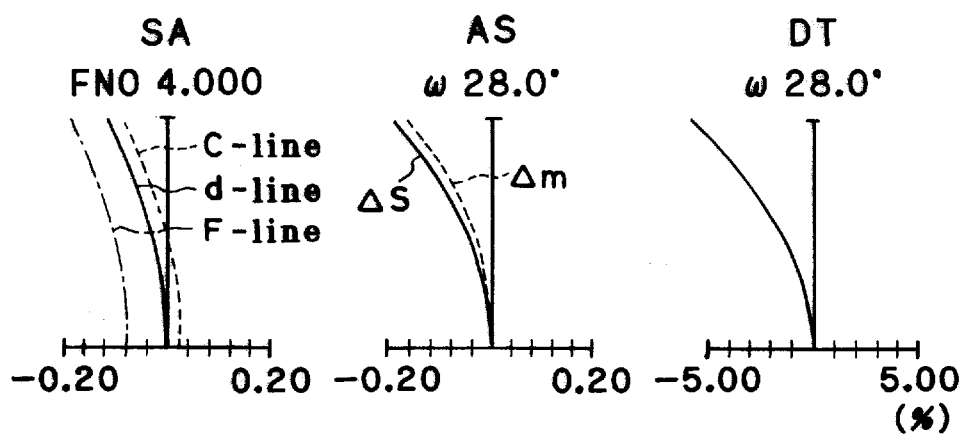
FIGS. 3(a), 3(b) and 3(c) are aberration diagrams of Example 1 upon focused at infinity.
Figure 3:
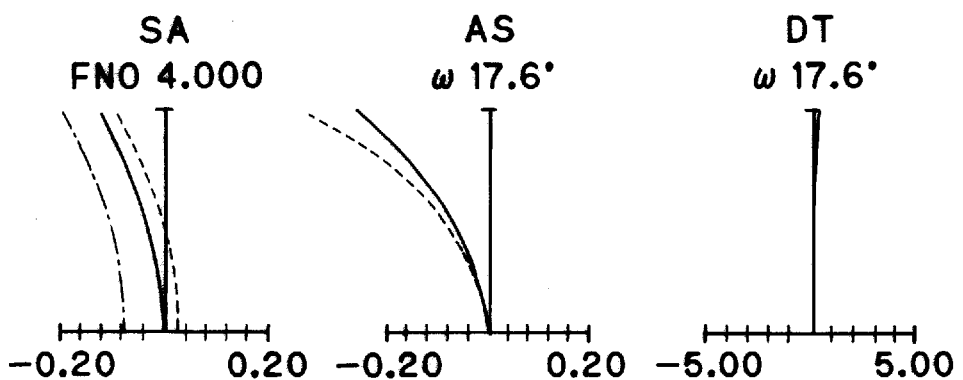
Figure 3:
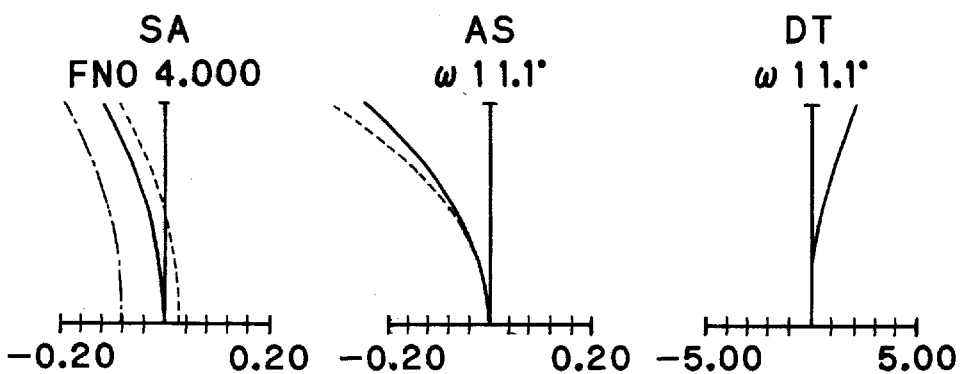
Figure 4:
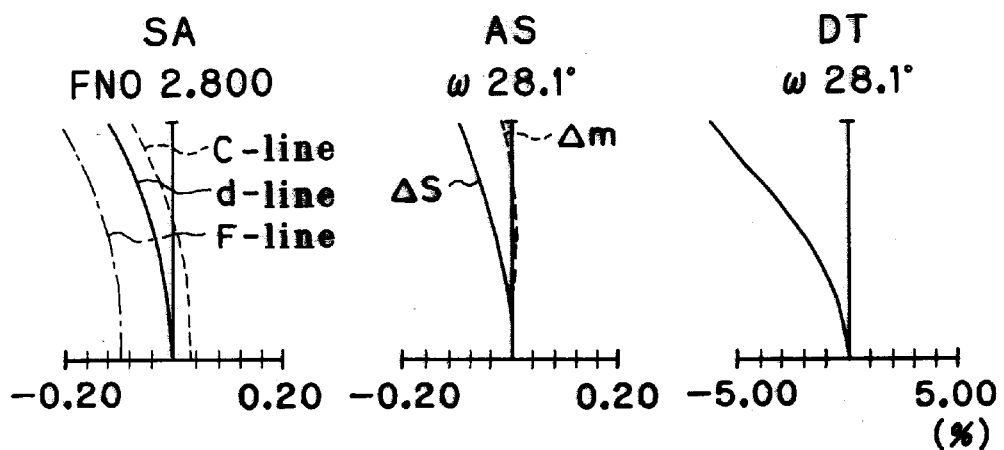
FIGS. 4(a), 4(b) and 4(c) are aberration diagrams of Example 2 upon focused at infinity.
Figure 4:
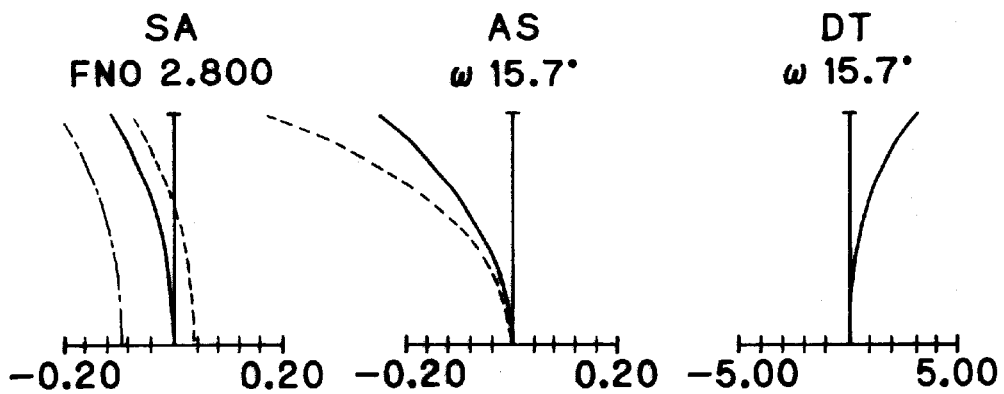
Figure 4:
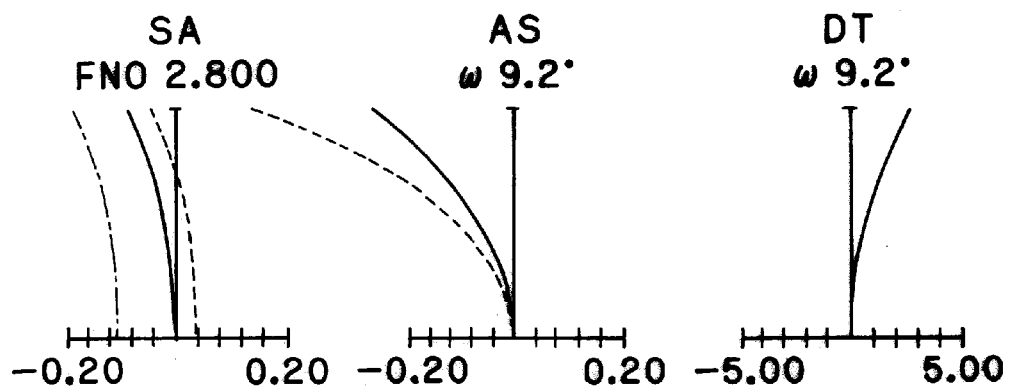

FIGS. 3(a), 3(b) and 3(c) are aberration curves at the wide-angle end, intermediate setting and telephoto end, respectively, of Example 1 upon focused at infinity. FIGS. 4(a), 4(b) and 4(c) are aberration curves at the wide-angle end, intermediate setting and telephoto end, respectively, of Example 2 upon focused at infinity. In FIGS. 3 and 4, SA, AS and DT stand for spherical aberration, astigmatism and distortion, respectively.

While, in the foregoing examples, the first, second and third lens groups G1, G2 and G3 are each described as consisting of one single lens, it is to be understood that each lens group may be made up of one cemented lens comprising a plurality of cemented lens elements.

Figure 5:
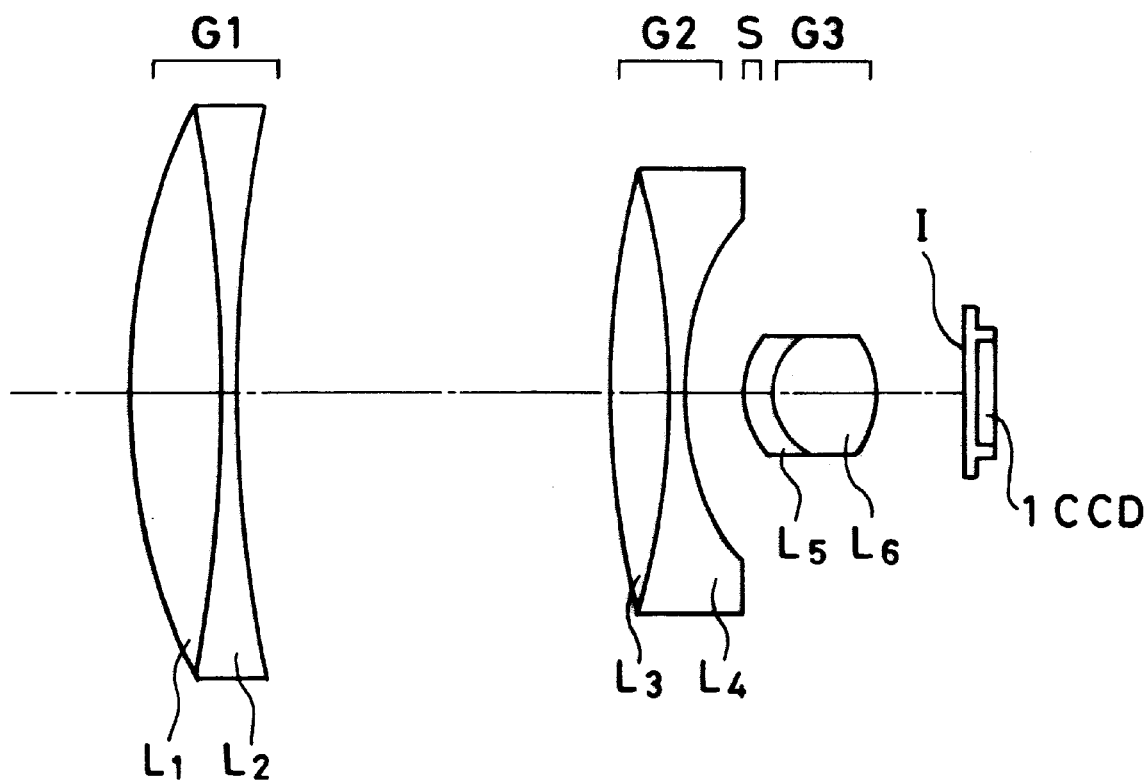
FIG. 5 is a conceptual representation of one modification to Example 1 at its telephoto end.
Figure 6:
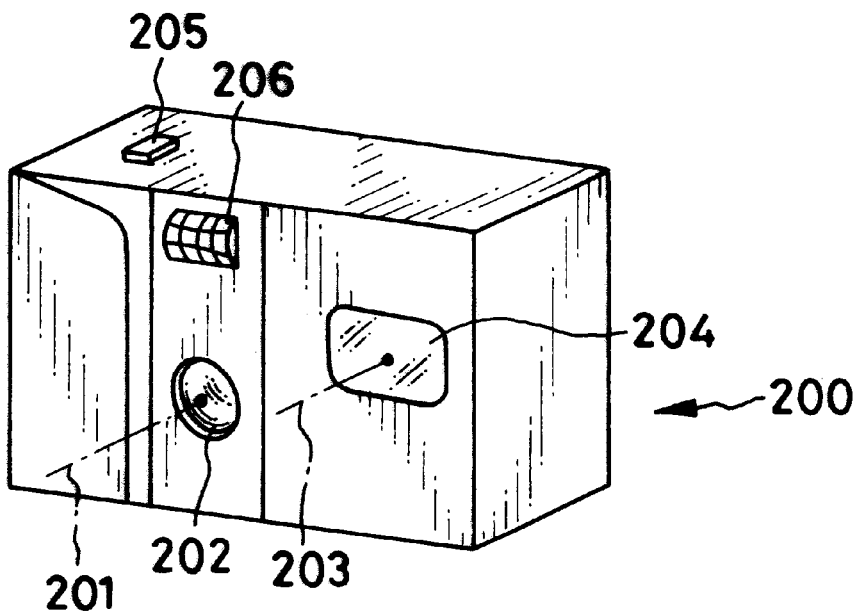
FIG. 6 is a front perspective view showing the appearance of an electronic camera in which the zoom lens system of the invention is incorporated in the form of an objective optical system.

FIG. 5 is a conceptual sectional view at a telephoto end of one modification to the arrangement according to Example 1, wherein the first lens group G1 is made up of one doublet consisting of a positive lens $L_1$ and a negative lens $L_2$, the second lens group G2 is made up of one doublet consisting of a positive lens $L_3$ and a negative lens $L_4$, and the third lens group G3 is made up of one doublet consisting of a negative lens $L_5$ and a positive lens $L_6$. Here the positive lens $L_1$ is made up of a double-convex lens, the negative lens $L_2$ a double-concave lens, the positive lens $L_3$ a double-convex lens, the negative lens $L_4$ a double-concave lens, the negative lens $L_5$ a negative meniscus lens, and the positive lens $L_6$ a double-convex lens. Numerical data about this modification are not shown. In FIG. 6, 1 stands for an electronic image pickup element or a CCD located on an image-forming plane I.

Figure 7:
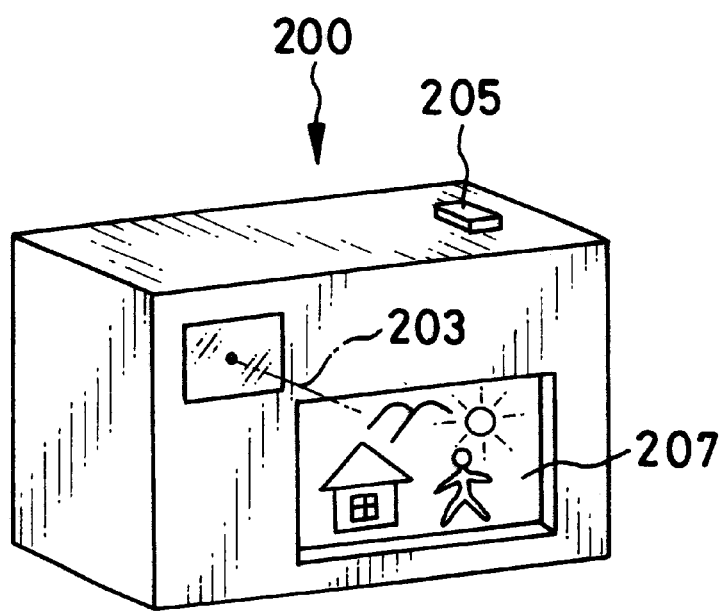
FIG. 7 is a rear perspective view showing the appearance of an electronic camera in which the zoom lens system of the invention is incorporated in the form of an objective optical system.
Figure 8:
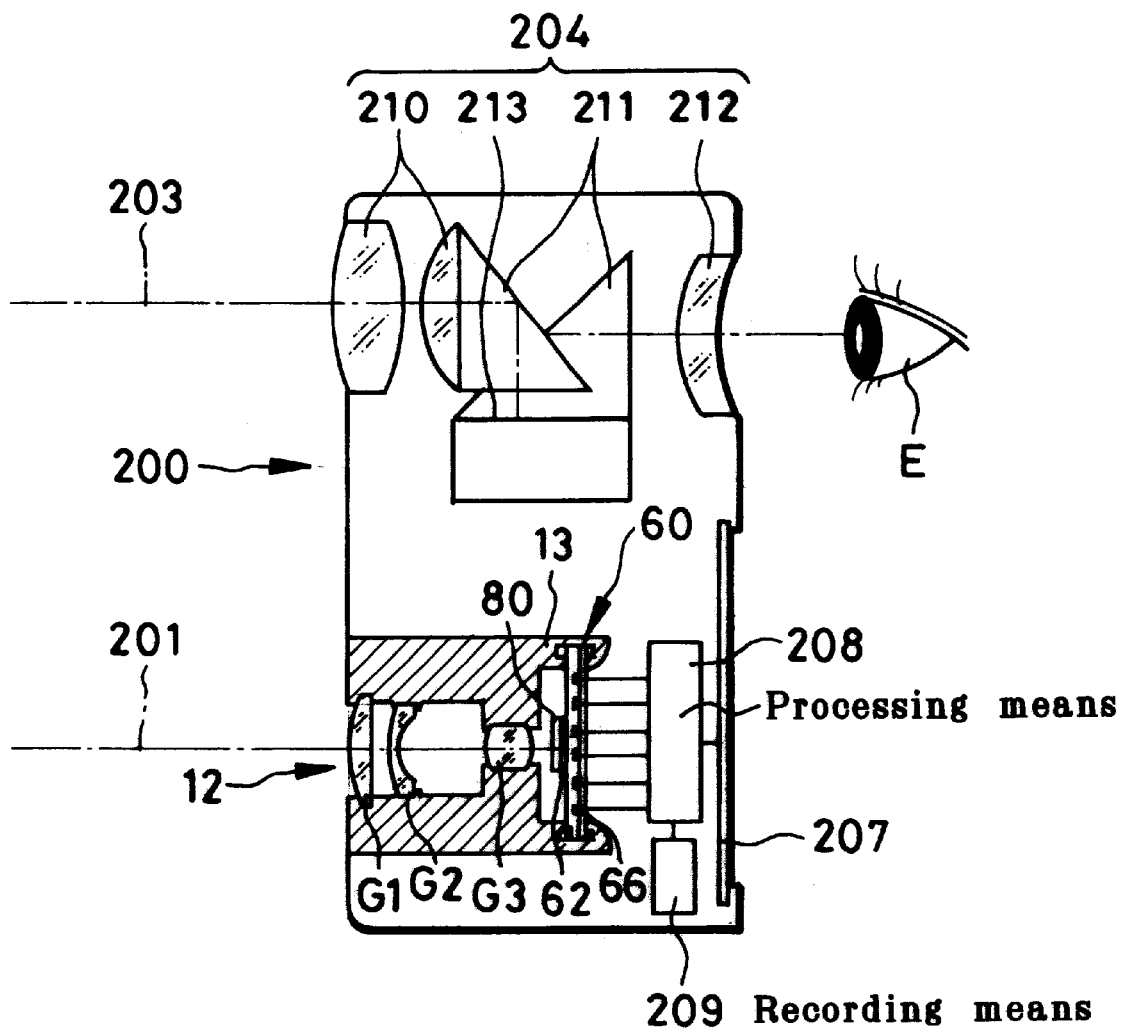
FIG. 8 is a sectional view showing the construction of an electronic camera in which the zoom lens system of the invention is incorporated in the form of an objective optical system.

An electronic camera in which the zoom lens system of the invention is incorporated in the form of an objective optical system is shown in FIGS. 6 to 8. FIGS. 6 and 7 are a front and a rear perspective view showing the appearance of an electronic camera 200, respectively, and FIG. 8 is a sectional view of the construction of the electronic camera 200. As depicted in FIGS. 6 to 8, the electronic camera 200 comprises a phototaking optical system 202 having a phototaking optical path 201, a finder optical system 204 having a finder optical path 203, a shutter 205, a flash 206 and a liquid crystal display monitor 207 having a flat screen. Upon pressing a shutter 205 mounted on the upper portion of the cameral 200, phototaking occurs through an objective lens system 12 made up of the zoom lens system of the invention (roughly illustrated) that is located as a phototaking objective optical system. An object image formed through the phototaking objective optical system is formed on an image pickup element chip 62 such as a CCD via an IR (infrared) cut filter 80.

It is here to be understood that the IR cut filter 80 is additionally pasted onto the image pickup element chip 62 to construct an integral image pickup unit 60. This image pickup unit 60 can be fitted in the rear end of a lens barrel 13 of the objective lens system 12 in one-touch simple operation, so that centering and alignment of the objective lens system 12 with respect to the image pickup element chip 62 can be dispensed with to achieve some commercial merits, for instance, simple assembly, high camera productivity and cost reductions. It is here noted that when the first lens group G1 is a fixed lens group, it is preferable to construct the lens in the first lens group G1 of a vitreous material of high hardness such as sapphire or provide it with a hard coating, because that lens also serves as a cover glass and so is susceptible to damage. When the first lens group G1 is designed to move, a cover glass 14 for protection of the objective lens system 12 is provided at the end of the lens barrel 13. It is here to be understood that the zoom lens driving mechanism in the lens barrel 13 is not shown.

The object image received at the image pickup element chip 62 is fed to a processing means 208 electrically connected to a terminal 66, through which the object image is displayed as an electronic image on the liquid crystal display monitor 207 mounted on the back side of the camera. This process means 208 also controls a recording means 209 for recording as electronic information the object image phototakan by the image pickup element chip 62. The recording means 209 may be either a memory attached to the processing means 208 or a device that is electrically connected to the processing means 208 to electronically write information in a magnetic recording medium such as a floppy disk or smart medium.

The finder optical system 204 having finder optical path 203 comprises a finder objective optical subsystem 210, a Porro prism 211 for erecting the object image formed by the finder objective optical subsystem 210 and an eyepiece 212 for guiding the object image to an viewer's eyeball E. The Porro prism 211 is divided into a front part and a rear part, between which there is a surface on which the object image is to be formed. On that surface there is located a field frame 213. The Porro prism 211 comprises four reflecting surfaces for erecting the object image formed by the finder objective optical subsystem 210.

To reduce the number of parts thereby achieving compactness and cost reductions, the finder optical system 204 may be removed from the camera 200. In this case, the viewer phototakes the object image while looking at the liquid crystal display monitor 207.

Figure 9:
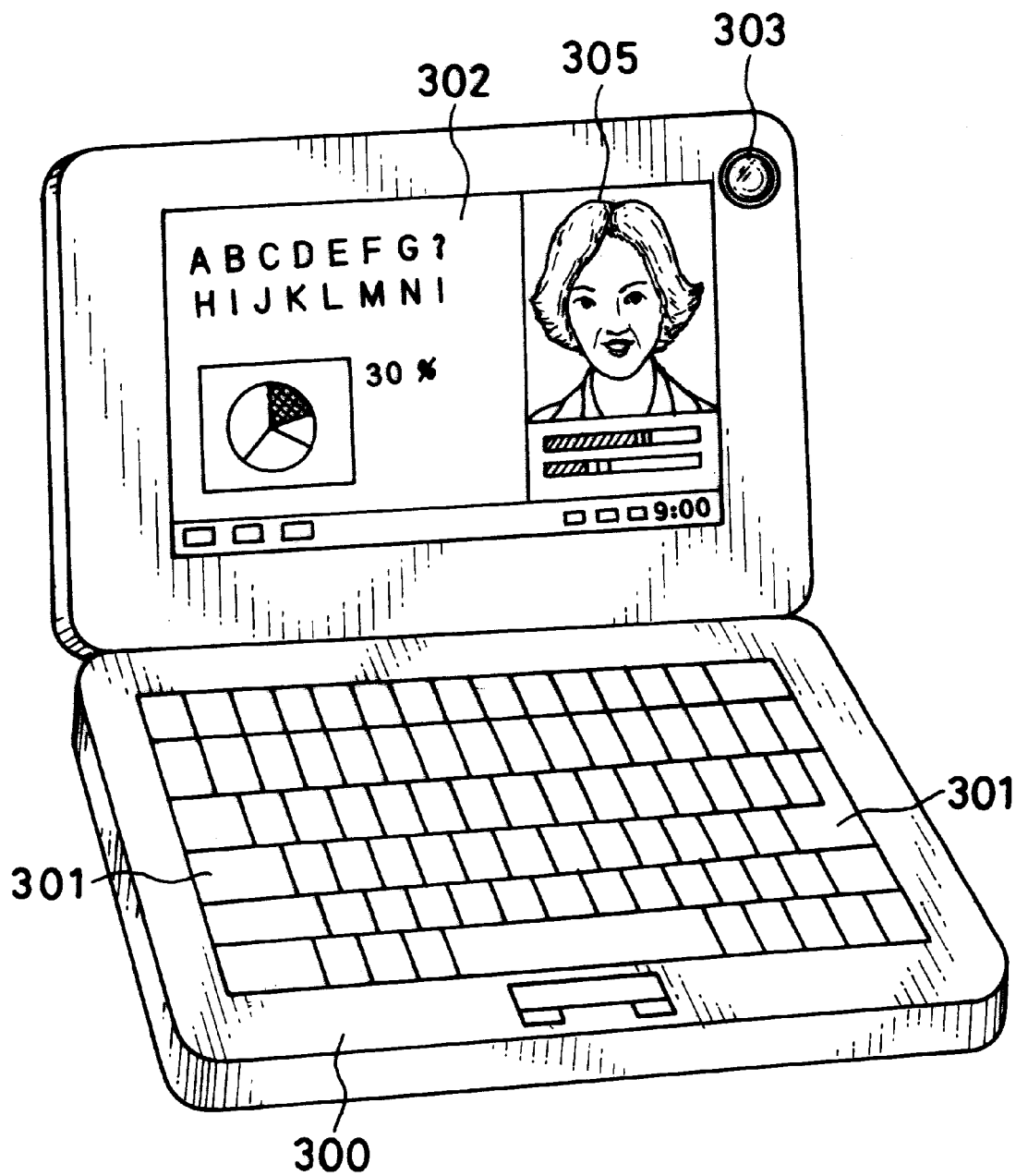
FIG. 9 is a front perspective view illustrative of an uncovered personal computer in which the zoom lens system of the invention is incorporated in the form of an objective optical system.
Figure 10:
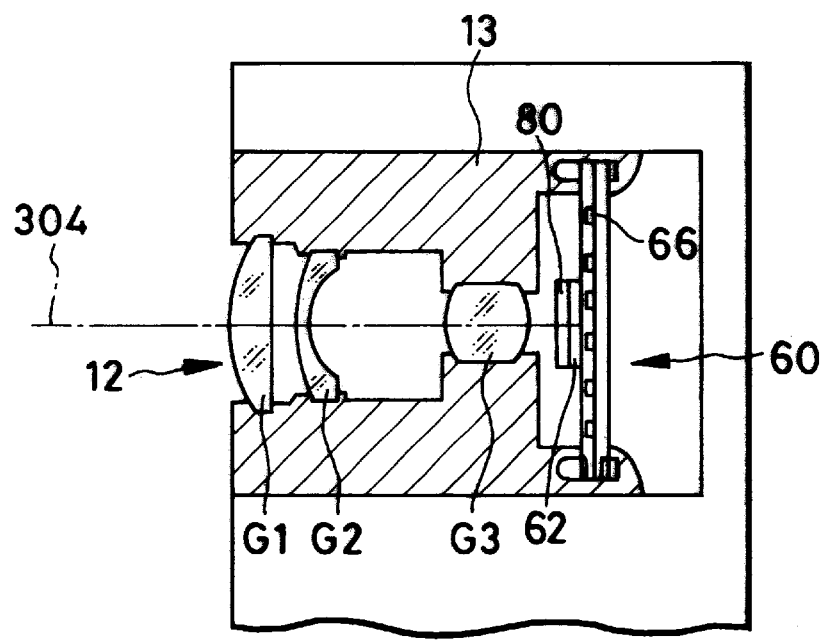
FIG. 10 is a sectional view illustrative of a phototaking optical system in a personal comppputer.
Figure 11:
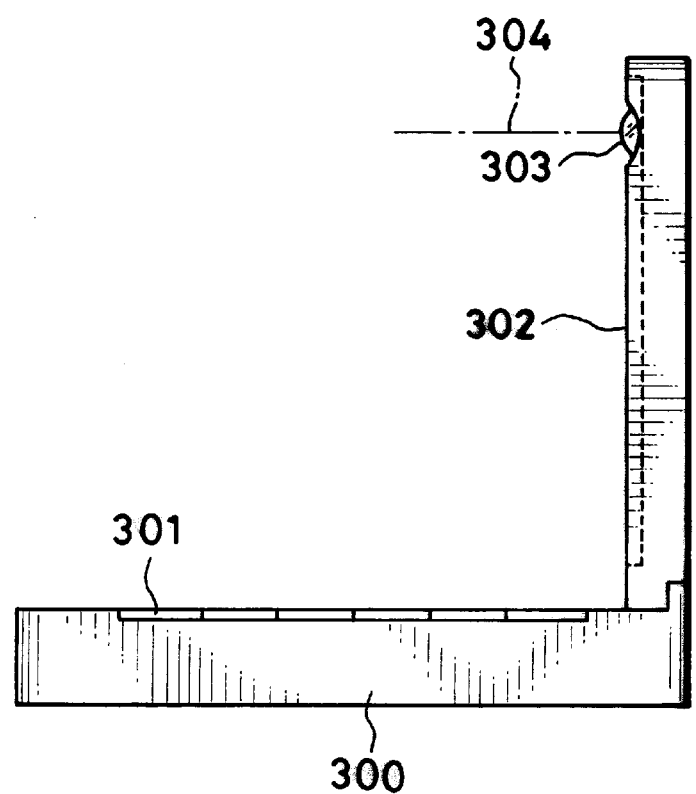
FIG. 11 is a side view of FIG. 9.

Shown in FIGS. 9 to 11 is a personal computer that is one example of the information processor in which the zoom lens system of the invention is incorporated in the form of an objective optical system. FIG. 9 is a front perspective views of an uncovered personal computer 300, FIG. 10 is a sectional view of a phototaking optical system 303 mounted on the personal computer 300, and FIG. 11 is a side view of FIG. 9. As depicted in FIGS. 9 to 11, the personal computer 300 comprises a key board 301 for allowing an operator to enter information therein from outside, information processing and recording means (not shown), a monitor 302 having a flat screen for displaying the information to the operator and a phototaking optical system 303 for phototaking an image of the operator per se and images of operator's surroundings. The monitor 302 used herein may be a transmission type liquid crystal display device designed to be illuminated by a backlight (not shown) from the back side, a reflection type liquid crystal display device designed to display images by reflecting light from the front side, a CRT display or the like. As shown, the phototaking optical system 303 is built in a right upper portion of monitor 302. However, it is to be understood that the phototaking optical system 303 may be positioned somewhere on the periphery of monitor 302 or keyboard 301.

The phototaking optical system 303 includes on a phototaking optical path 304 an objective lens system 12 comprising the zoom lens system of the invention (roughly illustrated) and an image pickup element chip 62 for receiving an image. These are built in the personal computer.

It is here to be understood that an IR cut filter 80 is additionally pasted onto the image pickup element chip 62 to construct an integral image pickup unit 60. This image pickup unit 60 can be fitted in the rear end of a lens barrel 13 of the objective lens system 12 in one-touch simple operation, so that centering and alignment of the objective lens system 12 with respect to the image pickup element chip 62 can be dispensed with to make assembly simple. At the end of the lens barrel 23, there is provided a cover glass 14 for protection of the objective lens system 12. It is here to be understood that the zoom lens driving mechanism in the lens barrel 13 is not shown.

An object image received at the image pickup element chip 62 is entered from a terminal 66 in the processing means in the personal computer 300, and displayed as an electronic image on the monitor 302. Shown in FIG. 9 as an example is a phototaken image 305 of the operator. It is possible to display the image 305, etc. on a personal computer at the other end on a remote place via an internet or telephone line.

Illustrated in FIG. 12 is a telephone handset that is one example of the information processor in which the zoom lens system of the invention is built in the form of a phototaking optical system, especially a convenient-to-carry portable telephone handset. FIG. 12(a) is a front view of a portable telephone handset 400, FIG. 12(b) is a side view of handset 400 and FIG. 12(c) is a sectional view of a phototaking optical system 405. As depicted in FIGS. 12(a) to 12(c), the telephone handset 400 comprises a microphone portion 401 for entering an operator's voice therein as information, a speaker portion 402 for producing a voice of a person on the other end, an input dial 403 allowing the operator to enter information therein, a monitor 404 having a flat screen for displaying phototaken images of the operator and the person on the other end and information such as telephone numbers, an antenna 406 for transmitting and receiving communication waves and a processing means (not shown) for processing image information, communication information, input signals, etc. The arrangement of these parts is not necessarily limited to that illustrated. The phototaking optical system 405 includes on a phototaking optical path 407 an objective lens system 12 comprising the zoom lens system (roughly illustrated) of the invention and an image pickup element chip 62 for receiving an object image. These are built in the telephone handset 400.

It is here to be understood that an IR cut filter 80 is additionally pasted onto the image pickup element chip 62 to construct an integral image pickup unit 60. This image pickup unit 60 can be fitted in the rear end of a lens barrel 13 of the objective lens system 12 in one-touch simple operation, so that centering and alignment of the objective lens system 12 with respect to the image pickup element chip 62 can be dispensed with to make assembly simple. At the end of the lens barrel 13, there is provided a cover glass 14 for protection of the objective lens system 12. It is here to be understood that the zoom lens driving mechanism in the lens barrel 13 is not shown.

The object image received at the image pickup element chip 62 is entered from a terminal 66 in a processing means (not shown), and displayed as an electronic image on the monitor 404 and/or a monitor on the other end. To transmit an image to a person on the other end, the processing means includes a signal processing function of converting information about the object image received at the image pickup element chip 62 to transmittable signals.

According to the present invention as explained above, it is possible to provide a zoom lens system of three-group construction, one lens for each group, which is less susceptible to aberration variations even upon zooming and can achieve entire-length reductions, large lens aperture and high zoom ratio.

What we claim is:

1. A zoom lens system of three-group construction comprising, in order from an object side thereof:
   a first lens group consisting of one single lens formed of a homogeneous medium and having positive refracting power;
   a second lens group consisting of one single lens formed of a homogeneous medium and having negative refracting power;
   and a third lens group consisting of one single lens formed of a homogeneous medium and having positive refracting power,
   wherein, for zooming from a wide-angle end to a telephoto end of said zoom lens system, at least said second lens group is adapted to be moved from said object side toward an image side of said zoom lens system;
   wherein, the three-group zoom lens system shall satisfy the following relation:

$$f_W < f_3 < f_T \quad (1)$$

where $f_W$ is a focal length at which said zoom lens system has the shortest focal length, $f_T$ is a focal length at which said zoom lens system has the longest focal length and $f_3$ is a focal length of the third lens group.

2. The three-group zoom lens system according to claim 1, wherein a convex lens in said third lens group is a double-convex lens.

3. The three-group lens system according to claim 1, wherein a convex lens in said third lens group has at least one surface defined by an aspherical surface.

4. A zoom lens system of three-group construction comprising, in order from an object side thereof:
   a first lens group consisting of one single lens formed of a homogeneous medium and having positive refracting power;
   a second lens group consisting of one single lens formed of a homogeneous medium and having negative refracting power; and
   a third lens group arranged immediately after said second lens group, said third lens group consisting of one single lens formed of a homogeneous medium and having positive refracting power, wherein for zooming from a wide-angle end to a telephoto end of said zoom lens system, at least said second lens group is adapted to be moved from said object side toward an image side of said zoom lens system, and
   wherein a convex lens in said third lens group has at least one surface defined by an aspherical surface.

5. The three-group zoom lens system according claim 4, where said first lens group consists of one convex lens having a strong convex surface directed to an object plane side of the zoom lens system and said second lens group consists of one concave lens having a strong concave surface directed toward an image plane side of the zoom lens system.

6. A zoom lens system of three-group construction comprising, in order from an object side thereof:

a first lens group consisting of one single lens formed of a homogeneous medium and having positive refracting power;

a second lens group consisting of one single lens formed of a homogeneous medium and having negative refracting power;

and a third lens group consisting of one single lens formed of a homogeneous medium and having positive refracting power, and wherein for zooming from a wide-angle end to a telephoto end of said zoom lens system, at least said second lens group is adapted to be moved from said object side toward an image side of said zoom lens system;

wherein, the three-group zoom lens system shall satisfy the following ratio relation:

$$5.0 < f_1/f_3 < 10.0 \tag{3}$$

where $f_1$ is a focal length of the first lens group and $f_3$ is a focal length of the third lens group.

7. A zoom lens system of three-group construction comprising, in order from an object side thereof:

a first lens group consisting of one single lens formed of a homogeneous medium and having positive refracting power;

a second lens group consisting of one single lens formed of a homogeneous medium and having negative refracting power; and a third lens group consisting of one single lens formed of a homogeneous medium and having positive refracting power;

wherein for zooming from a wide-angle end to a telephoto end of said zoom lens system, at least said second lens group is adapted to be moved from said object side toward an image side of said zoom lens system, and wherein the three-group zoom lens satisfies the following relation:

$$0.5 < L/f_T < 1.5 \tag{4}$$

where L is a distance from a rear surface in said second lens group to an image plane of said zoom lens system, at which said zoom lens system has the longest focal length and $f_T$ is a focal length at which said zoom lens system has the longest focal length.

8. A display device with a built-in three-group zoom lens system having phototaking function, which comprises:

a first lens group consisting of one positive lens, a second lens group consisting of one negative lens, a third lens group consisting of one positive lens, and an electronic image pickup element for receiving an object image formed by only refracting powers of said first lens group, said second lens group and said third lens group;

a processing circuit for electrically processing information on said object image received by said electronic image pickup element; and an image display element for displaying the information on said object image fed through said processing circuit to a viewer.

9. The display device with a built-in three-group zoom lens system having phototaking function according to claim 8, wherein said three-group zoom lens system is constructed in such a way that separations between said first lens group, said second lens group and said third lens group are varied for zooming from a wide-angle end to a telephoto end of said zoom lens system.

10. The display device with a built-in three-group zoom lens system having phototaking function according to claim 8, wherein said three-group zoom lens is constructed for zooming from a wide-angle end to a telephoto end of said zoom lens system in such a way that a separation between said first lens group and said second lens group becomes wide and a separation between said second lens group and said third lens group becomes narrow.

11. The display device with a built-in three-group zoom tens system having phototaking function according to claim 8, wherein a stop is located between said second lens group and said third lens group.

12. The display device with a built-in three-group zoom lens system having phototaking function according to claim 8, wherein a filter is located between said third lens group and said electronic image pickup element.

13. The display device with a built-in three-group zoom lens system having phototaking function according to claim 12, wherein said filter is in a plane-parallel plate form.

14. The display device with a built-in three-group zoom tens system having phototaking function according to claim 8, wherein said first lens group consists of one cemented lens comprising a plurality of cemented lens elements.

15. The display device with a built-in three-group zoom lens system having phototaking function according to claim 10, wherein said first lens group consists of one lens element.

16. The display device with a built-in three-group zoom lens system having phototaking function according to claim 8, wherein said second lens group consists of one cemented lens comprising a plurality of cemented lens elements.

17. The display device with a built-in three-group zoom lens system having phototaking function according to claim 8, wherein said second lens group consists of one lens element.

18. The display device with a built-in three-group zoom tens system having phototaking function according to claim 8, wherein said third lens group consists of one cemented lens comprising a plurality of cemented lens elements.

19. The display device with a built-in three-group zoom lens system having phototaking function according to claim 8, wherein said third lens group consists of one lens element.

20. The display device with a built-in three-group zoom lens system having phototaking function according to claim 8, wherein said image display element is built up of a liquid crystal display having a flat screen.

21. The display device with a built-in three-group zoom tens system having phototaking function according to claim 8, wherein said third lens group has at least one aspherical surface configured to make correction for aberrations.

22. The display device with a built-in three-group zoom lens system having phototaking function according to claim 8, which further satisfies the following ratio relation:

$$f_W < f_3 < f_T \tag{1}$$

where $f_W$ is a focal length at which said zoom lens system has the shortest focal length, $f_T$ is a focal length at which said zoom lens system has the longest focal length and $f_3$ is a focal length of said third lens group.

23. The display device with a built-in three-group zoom lens system having phototaking function according to claim 8, which further satisfies the following ratio relation:

$$-3.5 < f_1/f_2 < -2.0 \tag{2}$$

where $f_1$ is a focal length of said first lens group and $f_2$ is a focal length of said second lens group.

24. The display device with a built-in three-group zoom lens system having phototaking function according to claim 8, which further satisfies the following ratio relation:

$$5.0 < f_1/f_3 < 10.0 \tag{3}$$

where $f_1$ is a focal length of said first lens group and $f_3$ is a focal length of said third lens group.

25. The display device with a built-in three-group zoom lens system having phototaking function according to claim 8, which further satisfies the following ratio relation:

$$0.5 < L/f_T < 1.5 \tag{4}$$

where L is a distance from a rear surface in said second lens group to an image plane of said zoom lens system, at which said zoom lens system has the longest focal length and $f_T$ is a focal length at which said zoom lens system has the longest focal length.

26. The display device with a built-in three-group zoom lens system having phototaking function according to claim 8, wherein said first lens group remains fixed during zooming from said wide-angle end to said telephoto end.

27. The display device with a built-in three-group zoom lens system having phototaking function according to claim 8, wherein said zoom lens system is compactly housed in said display device by allowing said first lens group and said second lens group to move in such a way that a distance from a surface located nearest to said object side in said first lens group to said electronic image pickup element is reduced to a length between 20 mm and 2 mm.

28. The display device with a built-in three-group zoom lens system having phototaking function according to claim 8, wherein separations between said first lens group, said second lens group and said third lens group are variable in such a way as to satisfy the following zoom ratio condition:

$$1.2 < f_T/f_W < 25.0 \tag{6}$$

where $f_W$ is a focal length at which said zoom lens system has the shortest focal length and $f_T$ is a focal length at which said zoom lens system has the longest focal length.

29. A telephone handset comprising a display device with a built-in two-group zoom lens system having phototaking function as claimed in any one of claims 8, to 28, a microphone for entering an operator's voice therein, a speaker for producing a voice of a person on the other end and a dial button for entering at least a telephone number therein.

30. The telephone handset according to claim 29, further comprising an antenna for transmitting and/or receiving radio waves.

* * * * *